(12) United States Patent
Kim et al.

(10) Patent No.: US 9,164,769 B2
(45) Date of Patent: Oct. 20, 2015

(54) ANALYZING DATA FLOW GRAPH TO DETECT DATA FOR COPYING FROM CENTRAL REGISTER FILE TO LOCAL REGISTER FILE USED IN DIFFERENT EXECUTION MODES IN RECONFIGURABLE PROCESSING ARRAY

(75) Inventors: Won-Sub Kim, Anyang-si (KR); Tai-Song Jin, Seoul (KR); Dong-Hoon Yoo, Seoul (KR); Bernhard Egger, Seoul (KR); Jin-Seok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1009 days.

(21) Appl. No.: 12/962,741

(22) Filed: Dec. 8, 2010

(65) Prior Publication Data

US 2011/0238963 A1 Sep. 29, 2011

(30) Foreign Application Priority Data

Mar. 23, 2010 (KR) ........................ 10-2010-0025915

(51) Int. Cl.
*G06F 9/318* (2006.01)
*G06F 9/30* (2006.01)
*G06F 9/38* (2006.01)

(52) U.S. Cl.
CPC .......... *G06F 9/30189* (2013.01); *G06F 9/3012* (2013.01); *G06F 9/30141* (2013.01); *G06F 9/3887* (2013.01); *G06F 9/3889* (2013.01)

(58) Field of Classification Search
None
See application file for complete search history.

(56) References Cited

U.S. PATENT DOCUMENTS

| 6,606,699 | B2 | 8/2003 | Pechanek et al. | |
|---|---|---|---|---|
| 7,437,534 | B2 | 10/2008 | Tremblay et al. | |
| 7,529,917 | B2 | 5/2009 | Ryu et al. | |
| 7,673,120 | B2 * | 3/2010 | Hoyle et al. ................ | 712/218 |
| 2007/0150711 | A1 | 6/2007 | Kim et al. | |
| 2007/0186085 | A1 | 8/2007 | Yim et al. | |
| 2008/0120493 | A1 | 5/2008 | Yoo et al. | |
| 2009/0172282 | A1 * | 7/2009 | von Wendorff ............... | 711/117 |
| 2009/0193238 | A1 | 7/2009 | Bang et al. | |

FOREIGN PATENT DOCUMENTS

| KR | 10-1999-013772 | 2/1999 |
|---|---|---|
| KR | 10-0663709 | 12/2006 |
| KR | 10-0681199 | 2/2007 |
| KR | 10-2007-0080089 | 8/2007 |
| KR | 10-0813662 | 3/2008 |
| KR | 10-2009-0083596 | 8/2009 |

\* cited by examiner

*Primary Examiner* — Kenneth Kim
(74) *Attorney, Agent, or Firm* — NSIP Law (57) ABSTRACT

A reconfigurable array is provided. The reconfigurable array includes a Very Long Instruction Word (VLIW) mode and a Coarse-Grained Array (CGA) mode. When the VLIW mode is converted to the CGA mode, instead of sharing a central register file between the VLIW mode and the CGA mode, live data to be used in the CGA mode is copied from the central register file to local register files.

17 Claims, 7 Drawing Sheets

ANALYZING DATA FLOW GRAPH TO DETECT DATA FOR COPYING FROM CENTRAL REGISTER FILE TO LOCAL REGISTER FILE USED IN DIFFERENT EXECUTION MODES IN RECONFIGURABLE PROCESSING ARRAY

CROSS-REFERENCE TO RELATED APPLICATION

This application claims the benefit under 35 U.S.C. §119 (a) of Korean Patent Application No. 10-2010-0025915, filed on Mar. 23, 2010, the entire disclosure of which is incorporated herein by reference for all purposes.

BACKGROUND

1. Field

The following description relates to a reconfigurable processor, and more particularly, to a reconfigurable array that may switch between multiple processing modes.

2. Description of the Related Art

In general, a reconfigurable processor has hardware that may be tailored to perform a specific task. If a task is processed only in a hardware fashion, even a slight change of the task may make the processing of the task more difficult because of the fixed functionality of the hardware. On the other hand, if a task is processed only in a software fashion, changes to the task through software modification may be adjusted for but there is a disadvantage in that the task is processed slower as compared to the hardware-based processing.

Therefore, there is a desire for a reconfigurable processor that combines the advantages of hardware-based and software-based processing.

SUMMARY

In one general aspect, there is provided a reconfigurable array comprising a processing core including a plurality of processing elements that each have a respective local register file, the processing core configured to execute instructions in a first execution mode and a second execution mode, a central register file configured to store data related to the instructions, and a controller configured to control conversion between the first execution mode and the second execution mode of the processing core, and distribute data to be used in the second execution mode from among the data stored in the central register file to the local register files, in response to a request for conversion from the first mode to the second mode.

In the first execution mode, the processing core may execute the instructions using data from the central register files, and in the second execution mode, the processing core may execute the instructions using data from the local register file.

In the first execution mode, the processing core may execute an instruction related to an operation that is not a loop operation, and in the second execution mode, the processing core may execute an instruction related to another operation that is a loop operation.

In the first execution mode, the processing core may execute the instruction related to the operation that is not a loop operation using some of the plurality of processing elements, and in the second execution mode, the processing core may execute the instruction related to the other operation that is a loop operation using all of the plurality of processing elements.

The controller may analyze a data flow graph representing an execution sequence of the instructions, and may calculate scheduling priorities of data to be used in the second execution mode based on the number of edges of nodes on the data flow graph.

The controller may analyze an interconnection status of the local register files, and may calculate mapping priorities of the local register files using position scores based on the interconnection status of the local register files.

The controller may copy data to be used in the second execution mode to the local register files, based on the scheduling priorities and the mapping priorities.

In another aspect, there is provided a method of controlling a reconfigurable array having a first execution mode and at least a second execution mode, the method comprising detecting a mode conversion request, and distributing data to local register files, which is to be used in the second execution mode from among data stored in a central register file, in response to the mode conversion request, wherein the central register file stores data related to instructions, and the local register files are respectively formed in a plurality of processing elements included in the reconfigurable array.

The second execution mode may be for executing a loop operation and the first execution mode may be for executing another operation that is not a loop operation.

The detecting of the mode conversion request may comprise determining whether a request for conversion from the first execution mode to the second execution mode is received.

The distributing of the data to be used in the second mode may comprise analyzing a data flow graph representing an execution sequence of the instructions, and calculating scheduling priorities of data to be used in the second execution mode based on the number of edges of nodes on the data flow graph, analyzing an interconnection status of the local register file, and calculating mapping priorities of the local register files based on position scores of the local register files that are based on the interconnection status of the local register files, and copying the data to be used in the second execution mode to the local register files, based on the scheduling priorities and mapping priorities of the local register files.

In another aspect, there is provided a reconfigurable processor comprising a processing core comprising a plurality of processing elements configured to execute instructions, wherein each processing element has a respective local register file configured to store data, and the processing core operates in a first execution mode and at least a second execution mode, a central register file configured to store data used to execute the instructions and the execution results of the instructions, and a controller configured to control mode-conversion of the processing core such that when the controller receives a request to switch the processing core from the first execution mode to the second execution mode the controller distributes data from the central register file to the respective local registers files based on detected data to be used in the second execution mode.

The first execution mode may be a very long instruction word (VLIW) mode for executing instructions that do not include loop operations and the second execution mode may be a coarse-grained array (CGA) mode for executing instructions that include loop operations.

In the first execution mode the plurality of processing elements may access the central register file to read data therefrom to execute the instructions or to store data thereto, and in the second execution mode the plurality of processing elements may access their respective local register files to read data therefrom to execute the instructions or to store data thereto.

While in the first execution mode, the controller may analyze a data flow graph representing an execution sequence of the instructions to detect data to be used in the second execution mode.

The controller may analyze the data flow graph to determine priorities for scheduling data based on the number of edges of nodes of the data flow graph.

The controller may analyze the interconnections of each respective local register file with respect to other local register files to determine mapping priorities of the local register files, and the controller may copy data to the local register files based on the respective mapping priorities of each of the local register files.

The controller may analyze the data flow graph to determine priorities for scheduling data based on the number of edges of nodes of the data flow graph, and the controller may copy data to the local register files based on the mapping priorities of each of the local register files and the scheduling priorities of the data.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
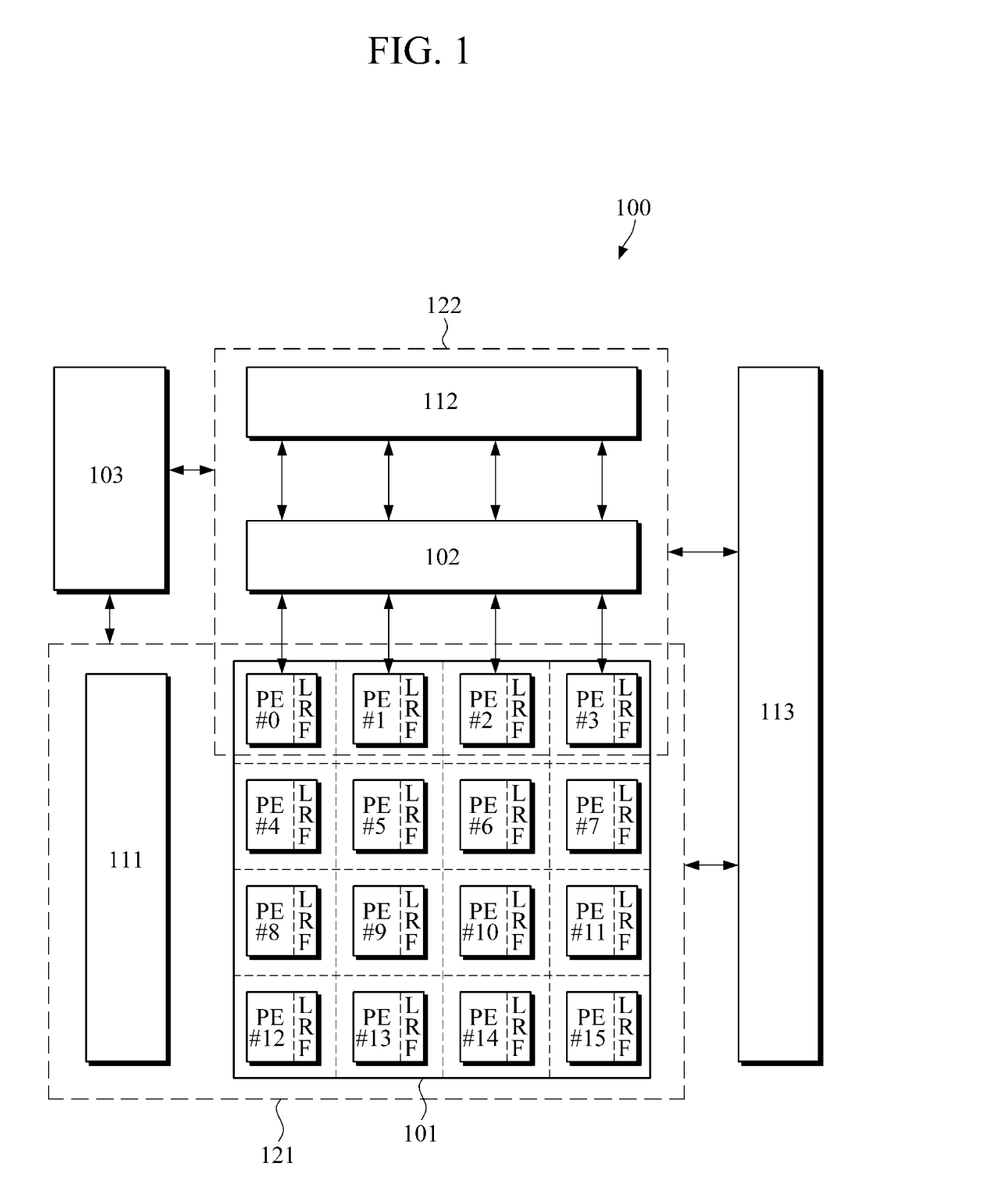
FIG. 1 is a diagram illustrating an example of a reconfigurable array.

FIG. 1 illustrates an example of a reconfigurable array.

Referring to FIG. 1, reconfigurable array 100 includes a processing core 101, a central register file 102, and a controller 103.

The processing core 101 may be composed of a plurality of processing elements PE#0 through PE#15. In this example, the processing core 101 includes sixteen processing elements. However, the processing core is not limited thereto. For example, the processing core may include 2 processing elements, 8 processing elements, 24 processing elements, and the like. The reconfigurable array may be a processor or may be included in a processor.

Each of the processing elements PE#0 through PE#15 has a local register file (LRF). The LRF stores data that may be used to execute instructions and also stores the execution results of the instructions.

The processing elements PE#0 through PE#15 may process instructions in parallel. For example, each of the processing elements PE#0 through PE#15 may independently process a part of an instruction that is not dependent on other parts of an instruction.

The processing elements PE#0 to PE#15 are connected to each other. For example, the output of a certain processing element PE#6 may be connected to an input of another processing element PE#11. The interconnections between the processing elements PE#0 to PE#15 may generate various combinations of processing elements. An interconnection status between the processing elements PE#0 to PE#15 is referred to as configuration information of the processing core 101. The configuration information of the processing core 101 may be stored in a configuration memory 111. The interconnection status between the processing elements PE#0 to PE#15 may vary based on the configuration information stored in the configuration memory 201. The configuration of the processing core 101 may be optimized for a specific process.

The processing core 101 executes instructions using multiple instruction execution modes. For example, the instruction execution modes may include a Coarse-Grained Array (CGA) mode for executing instructions associated with loop operations, and a Very Long Instruction Word (VLIW) mode for executing instructions associated with other operations that are not loop operations. For example, the processing core 101 may execute loop operations using one or more of the processing elements PE#0 to PE#15 in the CGA mode, for example, using all of each of the processing elements PE#0 to PE#15. As another example, the processing core 101 may execute other operations that are not loop operations using one or more of the processing elements PE#0 to PE#15 in the VLIW mode. For example, in the VLIW mode, a VLIW instruction word may be fetched from a data memory 113 to a VLIW instruction memory 112. The VLIW instruction word includes a plurality of instructions that are to be processed in parallel. For example, four processing elements PE#0 to PE#3 may process instructions in parallel in the VLIW mode.

The central register file 102 stores various data that may be used to execute the instructions and also stores the execution results of the instructions. For example, in the VLIW mode, the processing elements PE#0 to PE#3 may access the central register file 102 to read data therefrom or store the execution results therein. As another example, in the CGA mode, the processing elements PE#0 to PE#15 may access their respective local register files LRF to read data therefrom or to store the execution results therein.

In order for the individual processing elements PE#0 to PE#15 to use their local register files LRF, in the CGA mode, data to be used in the CGA mode should be copied from the central register file 102 to the local register files LRF in advance or as necessary.

The controller 103 controls mode-conversion of the processing core 101 and may distribute data to be used in the CGA mode to the local register files LRF, for example, when the processing core 101 is mode-converted from the VLIW mode to the CGA mode.

As an example, the controller 103 may detect data (hereinafter, referred to as live data) to be used in the CGA mode by analyzing a data flow graph (DFG) that identifies an instruction execution sequence. For example, the controller 103 may copy the live data to a specific register file LRF based on the interconnection status between the local register files LRF. The scheduling of live data or mapping of the local register files LRF is further described later.

For distribution of live data, the controller 103 may copy all of the live data to the local register files LRF before conversion into the CGA mode, in response to an execution mode conversion request such as an interrupt. Also, the controller 103 may predict a time at which live data will be used in the CGA mode and the controller 103 may copy the live data to the local register files LRF based on the predicted time of demand such that the data is available at the time the live data is needed.

In addition, the controller 103 may copy live data stored in the local register files LRF to the central register file 102, when the CGA mode is converted to the VLIW mode.

In the reconfigurable array 100, the central register file 102 is separated between the CGA mode and the VLIW mode, and the central register file 102 is not shared therebetween. Also, in the CGA mode, because the individual processing elements PE#0 to PE#15 execute instructions using the local register files LRF, flexible CGA scheduling may be performed regardless of the locations and the number of processing elements (for example, PE#0 to PE#3).

Figure 2A:
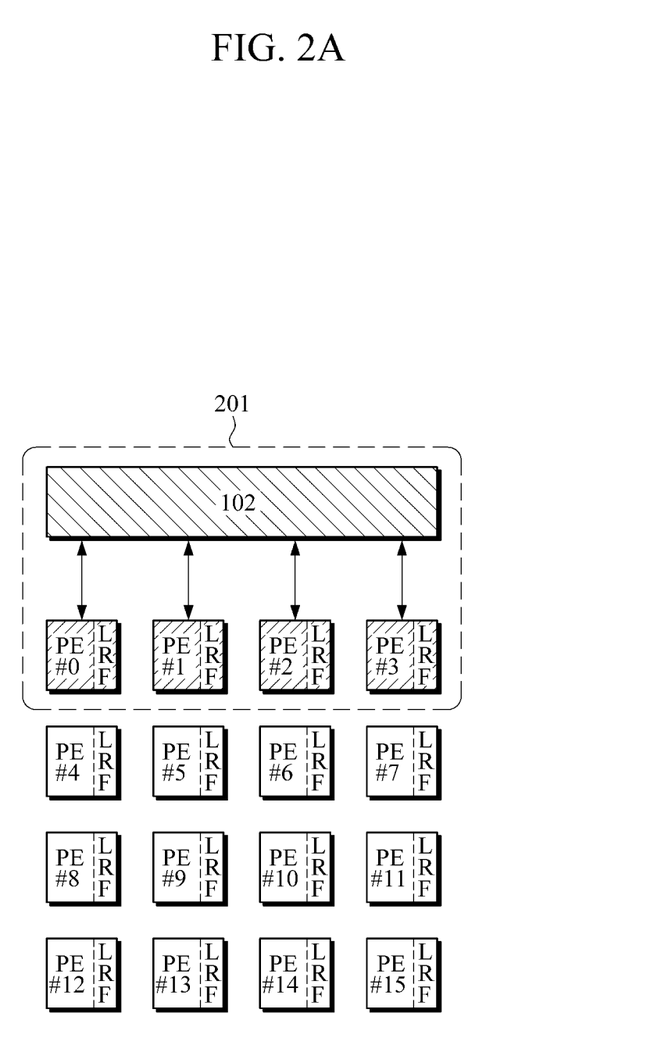
FIG. 2A is a diagram illustrating an example of a reconfigurable array in a Very Long Instruction Word (VLIW) mode.
Figure 2B:
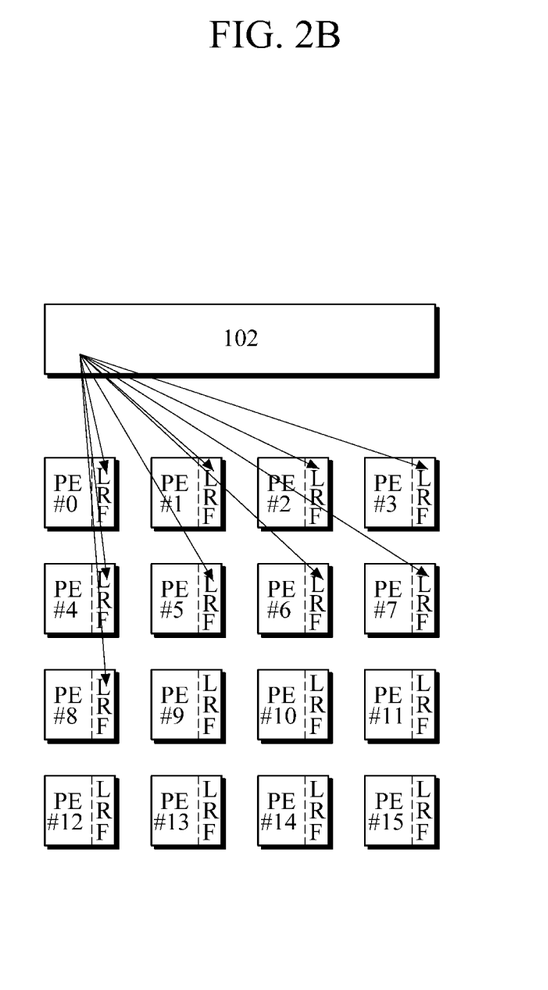
FIG. 2B is a diagram illustrating an example of live data distribution.

FIGS. 2A and 2B illustrate examples of a mode-conversion between instruction execution modes in the reconfigurable array.

FIG. 2A illustrates an example of a reconfigurable array in VLIW mode.

Referring to the example shown in FIG. 2A, processing elements PE#0 to PE#3 from among the processing elements PE#0 to PE#15, and the central register file 102, configure a VLIW architecture 201. In this example, the processing elements PE#0 to PE#3 execute instructions using the central register file 102.

FIG. 2B illustrates an example of live data distribution.

Referring to FIG. 2B, before conversion from the VLIW mode to the CGA mode, live data stored in the central register file 102 may be copied to the local register files LRF of the processing elements PE#0 to PE#15. Live data that is to be used in the CGA mode may be detected by analyzing a data flow graph that represents an instruction execution sequence. The locations to which the live data will be copied may be determined based on the interconnection relationship between the local register files LRF.

For example, all live data may be copied before conversion from the VLIW mode to the CGA mode, however, it is also possible that after entering the CGA mode, the live data may be copied.

Figure 2C:
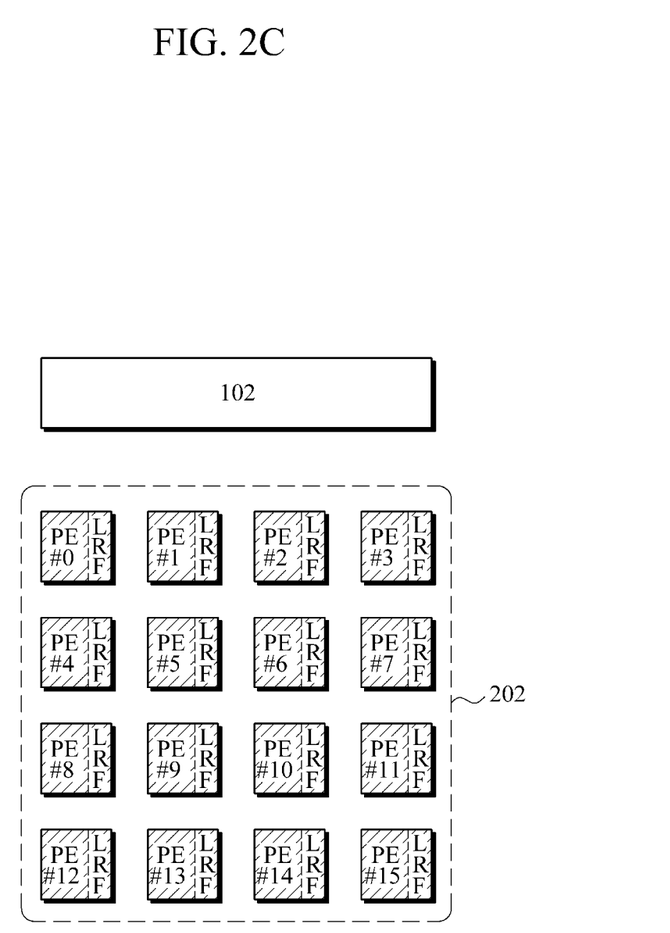
FIG. 2C is a diagram illustrating an example of a reconfigurable array in a Coarse-Grained Array (CGA) mode.

FIG. 2C illustrates an example of a reconfigurable processor in a CGA mode.

Referring to FIG. 2C, each of the processing elements PE#0 to PE#15 are configured in a CGA architecture 202. In the CGA architecture 202, each of the processing elements PE#0 to PE#15 execute instructions using their local register files LRF, instead of using the central register file 102.

When the CGA mode is converted to the VLIW mode again, the live data in the local register files LRF may be copied to the central register file 102, and the VLIW architecture 201 illustrated in FIG. 2A is configured in the VLIW mode.

Figure 3:
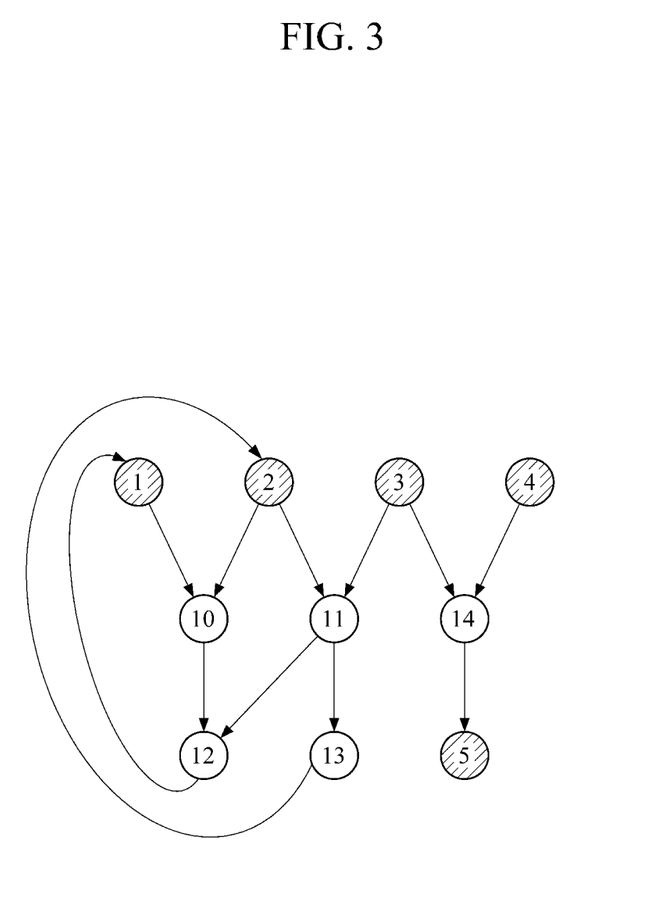
FIG. 3 illustrates an example of a data flow graph (DFG).

FIG. 3 illustrates an example of a data flow graph (DFG).

In FIG. 3, the data flow graph represents an instruction execution sequence. In this example, the nodes on the data flow graph represent input/output data and operations. For example, nodes 1 and 2 represent input/output data and nodes 10 and 12 represent operations. In this example, the nodes 1, 2, 10, and 12 on the data flow graph may apply values of nodes 1 and 2 to operations of nodes 10 and 12 and then store the results of the operations in the node 1.

Referring to FIGS. 1 and 3, the controller 103 may analyze a data flow graph that represents an instruction execution sequence and may determine priorities for the scheduling of live data. For example, the controller 103 may detect nodes 1, 2, 3, 4, and 5 that correspond to live data and nodes 10, 11, 12, 13, and 14 that correspond to operations from among nodes on the data flow graph. The nodes 1, 2, 3, 4, and 5 that correspond to the live data may be input/output nodes. The controller 103 may calculate the numbers of edges of the nodes 1 to 5 corresponding to the live data. For example, the number of edges of the node 1 is 1 (i.e. node 10) and the number of edges of the node 2 is 2 (i.e. nodes 10 and 11). The controller 103 may determine priorities for scheduling of live data based on the calculated numbers of edges of the nodes 1 to 5.

The controller 103 may analyze the interconnection relationship between the local register files LRF. For example, the controller 103 may calculate the number of connections of each local register file LRF with respect to the other local registers LRF. The controller 103 may determine position scores of the individual local register files LRF in proportion to the number of the connections of the local register files LRF. For example, the controller 103 may assign a higher position score to a local register file LRF that has a greater number of connections to other register files LRF.

Accordingly, the controller 103 may copy live data that has a highest priority based on the number of edges to a local register file LRF that has a highest position score. The controller 103 may copy live data that has a second-highest priority to a local register file LRF that also has a second-highest position score.

Figure 4:
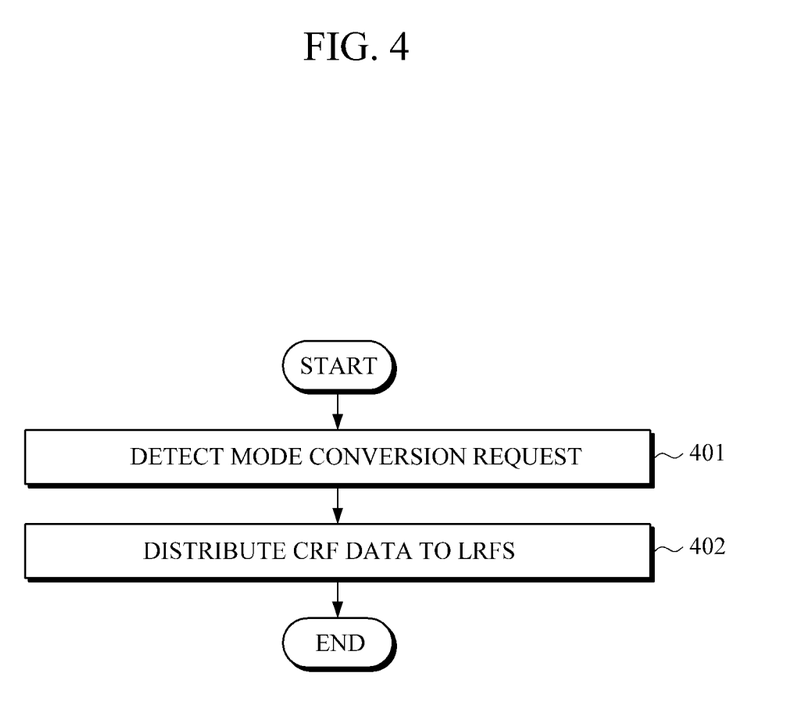
FIG. 4 is a flowchart illustrating an example of a method of controlling a reconfigurable array.

FIG. 4 illustrates an example of a method of controlling a reconfigurable array. The reconfigurable array control method of FIG. 4 may be applied to the reconfigurable array 100 that is illustrated in FIG. 1.

Referring to FIGS. 1 and 4, the reconfigurable array may detect a mode conversion request, in 401. For example, the controller 103 may determine whether a mode conversion request such as interrupt is received.

When the mode conversion request is a request for conversion from the VLIW mode to the CGA mode, in 402 the reconfigurable array distributes data to be used in the CGA mode from among data stored in the central register file 102 to the local register files LRF, in response to the mode conversion request. For example, the controller 103 may copy live data to the local register files LRF before conversion from the VLIW mode to the CGA mode. The controller 103 may copy live data to the local register files LRF based on a prediction time of demand at which live data will be used in the CGA mode.

For example, the reconfigurable array control method may further include an operation of copying data in the local register files LRF to the central register file 102 and then entering the VLIW mode, when a request for conversion from the CGA mode to the VLIW mode is received.

Figure 5:
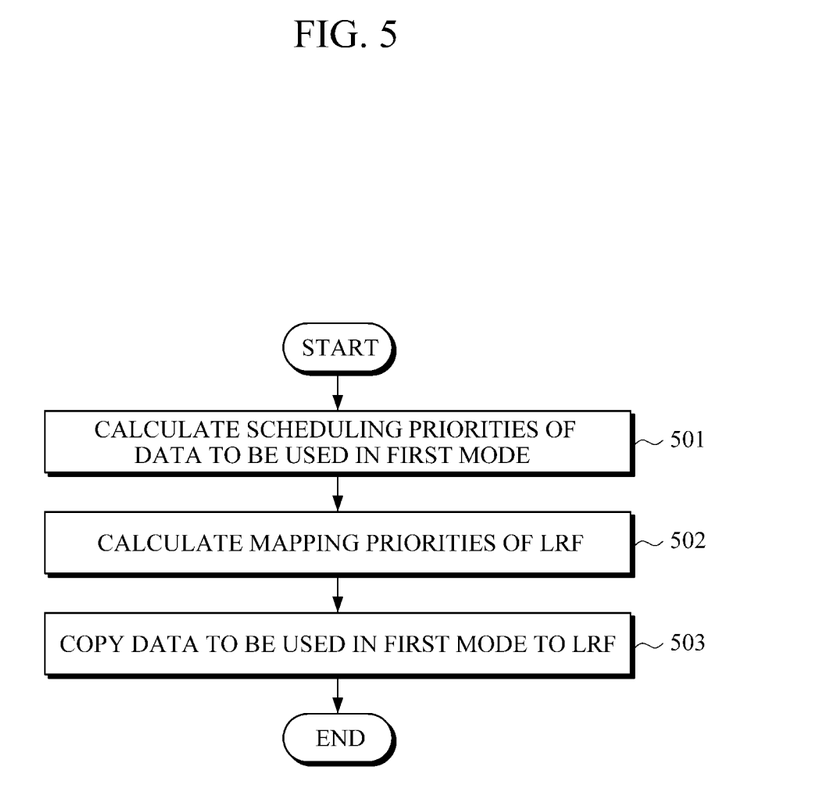
FIG. 5 is a flowchart illustrating an example of a method of distributing live data.

FIG. 5 illustrates an example of a method of distributing live data.

Referring to FIGS. 1 and 5, in 501 a data flow graph representing an instruction execution sequence is analyzed and scheduling priorities of live data are calculated based on the numbers of edges of nodes on the data flow graph. For example, the controller 103 may assign relatively higher scheduling priorities to nodes that have more edges.

In 502, the interconnection status of the local register files LRF may be analyzed and mapping priorities of the local register files LRF may be calculated using position scores of the local register files LRF based on the interconnection status. For example, the controller 103 may assign relatively higher mapping priorities to local register files LRF that have more interconnections to other register files LRF.

In 503, live data is copied to the local register files LRF based on the calculated scheduling priorities and mapping priorities. For example, the controller 103 may sequentially copy live data to the local register files LRF according to the scheduling priorities.

According to the above-described embodiments, because the central register file 102 is separated between the CGA mode and the VLIW mode and is not shared between them, and in the CGA mode, instructions are executed using local register files LRF, operation efficiency in the CGA mode is enhanced and flexible CGA scheduling may be performed.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable array comprising:
   a processing core including a plurality of processing elements that each have a respective local register file, the processing core configured to execute instructions in a first execution mode and a second execution mode;
   a central register file configured to store data related to the instructions; and
   a controller configured to control conversion between the first execution mode and the second execution mode of the processing core, and copy data to be used in the second execution mode from among the data stored in the central register file to the local register files, in response to a request for conversion from the first execution mode to the second execution mode, wherein the controller is configured to analyze a data flow graph representing an execution sequence of the instructions to detect the data to be used in the second execution mode, wherein in the first execution mode, the processing core is configured to read data in the central register file using at least one of the plurality of processing elements and to execute the instructions using the data from the central register files, and in the second execution mode, the processing core is configured to read data in the local register file using at least one of the plurality of processing elements and to execute the instructions using the data from the local register file.

2. The reconfigurable array of claim 1, wherein the processing core is capable of executing the instructions using only data that is retrieved from the local register files.

3. The reconfigurable array of claim 1, wherein in the first execution mode, the processing core is configured to execute an instruction related to an operation that is not a loop operation, and in the second execution mode, the processing core is configured to execute an instruction related to another operation that is a loop operation.

4. The reconfigurable array of claim 3, wherein in the first execution mode, the processing core is configured to execute the instruction related to the operation that is not a loop operation using some of the plurality of processing elements, and in the second execution mode, the processing core is configured to execute the instruction related to the other operation that is a loop operation using all of the plurality of processing elements.

5. The reconfigurable array of claim 1, wherein the controller is configured to calculate scheduling priorities of data to be used in the second execution mode based on the number of edges of nodes on the data flow graph.

6. The reconfigurable array of claim 5, wherein the controller is configured to analyze an interconnection status of the local register files, and calculate mapping priorities of the local register files using position scores based on the interconnection status of the local register files.

7. The reconfigurable array of claim 6, wherein the controller is configured to copy data to be used in the second execution mode to the local register files based on the scheduling priorities and the mapping priorities.

8. A method of controlling a reconfigurable array having a first execution mode and at least a second execution mode, the method comprising:
   detecting a mode conversion request;
   copying data to local register files, which is to be used in the second execution mode from among data stored in a central register file, in response to the mode conversion request,
wherein the central register file stores data related to instructions, and the local register files are respectively formed in a plurality of processing elements included in the reconfigurable array, and
   in the first execution mode, reading data in the central register file using at least one of the plurality of processing elements and executing the instructions using the data from the central register files, and in the second execution mode, reading data in the local register file using at least one of the plurality of processing elements and executing the instructions using the data from the local register file,
   wherein the copying data of the data to be used in the second execution mode comprises:

analyzing a data flow graph representing an execution sequence of the instructions to detect the data to be used in the second execution mode.

9. The method of claim 8, wherein the second execution mode is for executing a loop operation and the first execution mode is for executing another operation that is not a loop operation.

10. The method of claim 8, wherein the detecting of the mode conversion request comprises determining whether a request for conversion from the first execution mode to the second execution mode is received.

11. The method of claim 8, wherein the copying of the data to be used in the second execution mode further comprises:
    calculating scheduling priorities of data to be used in the second execution mode based on the number of edges of nodes on the data flow graph;
    analyzing an interconnection status of the local register file, and calculating mapping priorities of the local register files based on position scores of the local register files that are based on the interconnection status of the local register files; and
    copying the data to be used in the second execution mode to the local register files, based on the scheduling priorities and mapping priorities of the local register files.

12. A processor comprising:
    a processing core comprising a plurality of processing elements configured to execute instructions, wherein each processing element has a respective local register file configured to store data, and the processing core is configured to operate in a first execution mode and at least a second execution mode;
    a central register file configured to store data used to execute the instructions and the execution results of the instructions; and
    a controller configured to control mode-conversion of the processing core such that when the controller receives a request to switch the processing core from the first execution mode to the second execution mode the controller copy data to be used in the second execution mode from the central register file to the respective local registers files,
    wherein while in the first execution mode, the controller is configured to analyze a data flow graph representing an execution sequence of the instruction to detect data to be used in the second execution mode,
        wherein in the first execution mode, the processing core is configured to read data in the central register file using at least one of the plurality of processing elements and to execute the instructions using the data from the central register files, and in the second execution mode, the processing core is configured to read data in the local register file using at least one of the plurality of processing elements and to execute the instructions using the data from the local register file.

13. The processor of claim 12, wherein the first execution mode is a very long instruction word (VLIW) mode for executing instructions that do not include loop operations and the second execution mode is a coarse-grained array (CGA) mode for executing instructions including loop operations.

14. The processor of claim 12, wherein in the first execution mode the plurality of processing elements are configured to access the central register file to read data therefrom to execute the instructions or to store data thereto, and in the second execution mode the plurality of processing elements are configured to access their respective local register files to read data therefrom to execute the instructions or to store data thereto.

15. The processor of claim 12, wherein the controller is configured to analyze the data flow graph to determine priorities for scheduling data based on the number of edges of nodes of the data flow graph.

16. The processor of claim 12, wherein the controller is configured to analyze the interconnections of each respective local register file with respect to other local register files to determine mapping priorities of the local register files, and the controller is configured to copy data to the local register files based on the respective mapping priorities of each of the local register files.

17. The processor of claim 12, wherein the controller is configured to analyze the data flow graph to determine priorities for scheduling data based on the number of edges of nodes of the data flow graph, and the controller is configured to copy data to the local register files based on mapping priorities of each of the local register files and scheduling priorities of the data.

\* \* \* \* \*